United States Patent
Agrawal et al.

(10) Patent No.: US 9,128,951 B1
(45) Date of Patent: Sep. 8, 2015

(54) SYSTEMS AND METHODS FOR VARIABLE-LENGTH CHUNKING FOR DEDUPLICATION

(75) Inventors: Mukund Agrawal, Maharashtra (IN); Srineet Sridharan, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 346 days.

(21) Appl. No.: 13/455,408

(22) Filed: Apr. 25, 2012

(51) Int. Cl.
*G06F 17/30* (2006.01)

(52) U.S. Cl.
CPC .................... *G06F 17/30159* (2013.01)

(58) Field of Classification Search
CPC ............... G06F 17/3015; G06F 17/30159
See application file for complete search history.

(56) References Cited

U.S. PATENT DOCUMENTS

| | | | |
|---|---|---|---|
| 7,281,006 B2 * | 10/2007 | Hsu et al. | 707/698 |
| 7,523,098 B2 * | 4/2009 | Hirsch et al. | 1/1 |
| 2006/0047855 A1 * | 3/2006 | Gurevich et al. | 709/247 |
| 2008/0133561 A1 * | 6/2008 | Dubnicki et al. | 707/101 |
| 2009/0013129 A1 * | 1/2009 | Bondurant | 711/115 |
| 2009/0271402 A1 * | 10/2009 | Srinivasan et al. | 707/6 |
| 2010/0094817 A1 * | 4/2010 | Ben-Shaul et al. | 707/697 |
| 2011/0225385 A1 * | 9/2011 | Tofano | 711/170 |
| 2012/0036319 A1 * | 2/2012 | Bondurant | 711/111 |
| 2012/0226672 A1 * | 9/2012 | Hayashi et al. | 707/698 |
| 2013/0086009 A1 * | 4/2013 | Li et al. | 707/692 |

OTHER PUBLICATIONS

"Data Domain", http://www.emc.com/data-protection/data-domain/index.htm, as accessed Feb. 21, 2012, EMC Corporation, (On or before Feb. 21, 2012).

* cited by examiner

*Primary Examiner* — James Trujillo
*Assistant Examiner* — Hubert Cheung
(74) *Attorney, Agent, or Firm* — ALG Intellectual Property, LLC (57) ABSTRACT

A computer-implemented method for variable-length chunking may include 1) identifying a first data stream subject to deduplication, 2) identifying a predetermined chunk of the first data stream that starts at a first location and ends at a second location within the first data stream, 3) identifying a second data stream with a matching chunk for the predetermined chunk that starts at a third location and ends at a fourth location within the second data stream, 4) identifying a subsequent chunk within the second data stream that starts at the fourth location and ends at a fifth location within the second data stream, 5) calculating a candidate boundary offset within the first data stream based on exceeding the second location by a difference between the fifth location and the fourth location, and 6) performing a boundary test at the candidate boundary offset. Various other methods, systems, and computer-readable media are disclosed.

20 Claims, 7 Drawing Sheets

SYSTEMS AND METHODS FOR VARIABLE-LENGTH CHUNKING FOR DEDUPLICATION

BACKGROUND

Deduplicated data systems are often able to reduce the amount of space required to store files by recognizing redundant data patterns. For example, a deduplicated data system may reduce the amount of space required to store similar files by dividing the files into chunks and storing only unique chunks. In this example, each deduplicated file may simply consist of a list of chunks that make up the file.

Some traditional deduplicated data systems may divide files into fixed-width chunks. Unfortunately, this approach may result in large amounts of duplicate information that will not be deduplicated. For example, a long sequence of data in one file may begin at a fixed-width chunk boundary of the file, while the same long sequence of data may begin in the middle of a fixed-width chunk of another file, resulting in no identical fixed-width chunks that may be deduplicated between the two files.

In order to facilitate the deduplication of identical sequences of data at arbitrary offsets within files, some traditional deduplicated data systems may divide files into variable-width chunks. Unfortunately, traditional methods for determining optimal chunk boundaries may involve performing millions or billions of operations per file, thereby consuming significant time and computing resources. Accordingly, the instant disclosure identifies and addresses a need for additional and improved systems and methods for variable-length chunking for deduplication.

SUMMARY

As will be described in greater detail below, the instant disclosure generally relates to systems and methods for variable-length chunking for deduplication by using chunk-boundary data for files that have already been chunked as indications of likely chunk boundaries for files that are being chunked. In one example, a computer-implemented method for variable-length chunking for deduplication may include 1) identifying a first data stream subject to deduplication using variable-length chunking, 2) identifying a predetermined chunk of the first data stream that starts at a first location within the first data stream and ends at a second location within the first data stream, 3) identifying, based on the predetermined chunk, a second data stream with a matching chunk that matches the predetermined chunk and that starts at a third location within the second data stream and ends at a fourth location within the second data stream, 4) identifying a subsequent chunk within the second data stream that starts at the fourth location within the second data stream and ends at a fifth location within the second data stream, 5) calculating a candidate boundary offset within the first data stream based on exceeding the second location within the first data stream by a difference between the fifth location within the second data stream and the fourth location within the second data stream, and 6) performing a boundary test at the candidate boundary offset to determine whether the candidate boundary offset is a location of a chunk boundary within the first data stream.

In some examples, identifying the predetermined chunk may include 1) identifying a candidate data stream with metadata that matches the first data stream, 2) identifying a first chunk end boundary within the candidate data stream, 3) performing the boundary test at an offset within the first data stream equal to an offset of the first chunk end boundary within the candidate data stream to determine whether the offset within the first data stream is a location of a boundary of the predetermined chunk.

In some embodiments, identifying the second data stream may include 1) identifying a plurality of candidate data streams that include a plurality of matching chunks that match the predetermined chunk and 2) selecting the second data stream from the plurality of candidate data streams based on an additional similarity between the first data stream and the second data stream. In these embodiments, selecting the second data stream may include 1) selecting the second data stream based on a similarity between the name of the first data stream and the name of the second data stream, 2) selecting the second data stream based on a similarity between the size of the first data stream and the size of the second data stream, and 3) selecting the second data stream based on a similarity between the relative location of the first location within the first data stream and the relative location of the third location within the second data stream.

In some examples, one or more of the boundaries within the second data stream may have been determined based on the boundary test. For example, one or more of the systems described herein may have identified the fifth location as a boundary of the subsequent chunk by performing the boundary test at the fifth location within the second data stream. The boundary test may include any of a variety of operations. In one example, performing the boundary test may include calculating a checksum at the candidate boundary offset.

In some embodiments, performing the boundary test may include determining that the candidate boundary offset does not include the chunk boundary within the first data stream. In these embodiments, the computer-implemented method may also include performing the boundary test at sequential offsets within the first data stream until the boundary test identifies the chunk boundary within the first data stream. In some examples, performing the boundary test may include determining that the candidate boundary offset includes the chunk boundary within the first data stream. In these examples, the computer-implemented method may also include identifying a new chunk beginning at the second location within the first data stream and ending at the candidate boundary offset within the first data stream. In these examples, the computer-implemented method may also include deduplicating the first data stream by deduplicating the new chunk with at least one identical chunk.

In one embodiment, a system for implementing the above-described method may include 1) an identification module programmed to a) identify a first data stream subject to deduplication using variable-length chunking and b) identify a predetermined chunk of the first data stream that starts at a first location within the first data stream and ends at a second location within the first data stream, 2) a matching module programmed to identify, based on the predetermined chunk, a second data stream that includes a matching chunk that matches the predetermined chunk, starts at a third location within the second data stream, and ends at a fourth location within the second data stream, 3) a location module programmed to identify a subsequent chunk within the second data stream that starts at the fourth location within the second data stream and ends at a fifth location within the second data stream, 4) a mapping module programmed to calculate a candidate boundary offset within the first data stream based on exceeding the second location within the first data stream by a difference between the fifth location within the second data stream and the fourth location within the second data stream, and 5) a testing module programmed to perform a boundary test at the candidate boundary offset to determine whether the candidate boundary offset is a location of a chunk boundary within the first data stream. The system may also include at least one processor configured to execute the identification module, the matching module, the location module, the mapping module, and the testing module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify a first data stream subject to deduplication using variable-length chunking, 2) identify a predetermined chunk of the first data stream that starts at a first location within the first data stream and ends at a second location within the first data stream, 3) identify, based on the predetermined chunk, a second data stream with a matching chunk that matches the predetermined chunk and that starts at a third location within the second data stream and ends at a fourth location within the second data stream, 4) identify a subsequent chunk within the second data stream that starts at the fourth location within the second data stream and ends at a fifth location within the second data stream, 5) calculate a candidate boundary offset within the first data stream based on exceeding the second location within the first data stream by a difference between the fifth location within the second data stream and the fourth location within the second data stream, and 6) perform a boundary test at the candidate boundary offset to determine whether the candidate boundary offset is a location of a chunk boundary within the first data stream.

As will be explained in greater detail below, by using chunk-boundary data for files that have already been chunked as indications of likely chunk boundaries for files that are being chunked, the systems and methods described herein may use similarities between files to quickly locate candidate boundaries (instead of, e.g., performing rolling checksums across entire files to find each chunk boundary). By using existing chunking data to target locations within files for chunk boundary tests, these systems and methods may avoid millions of I/O and checksum operations for each file requiring chunking.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
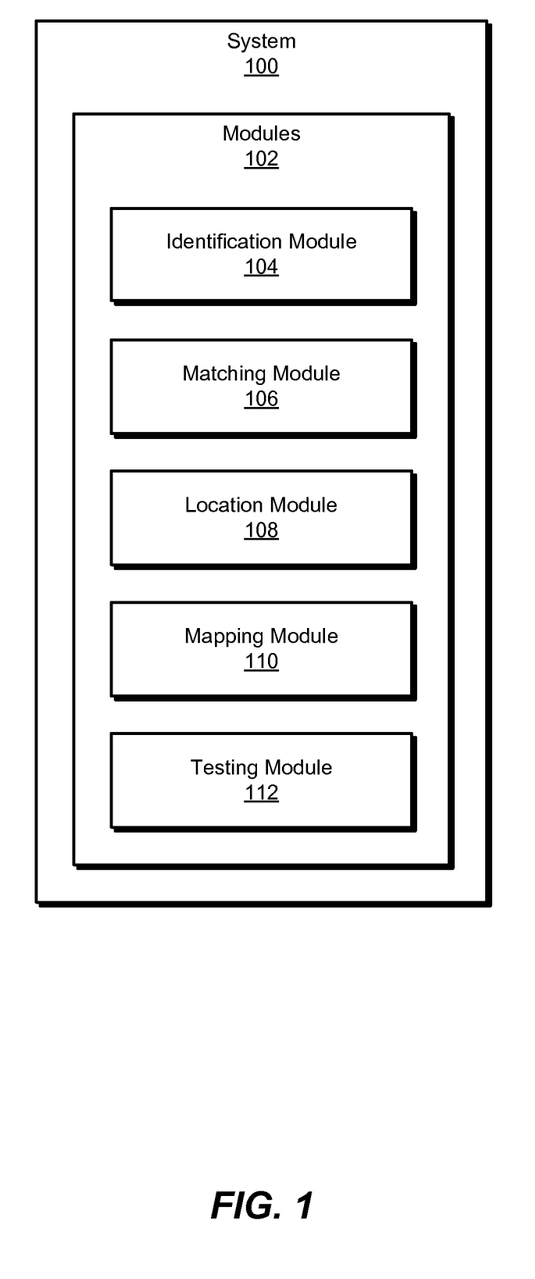
FIG. 1 is a block diagram of an exemplary system for variable-length chunking for deduplication.
Figure 2:
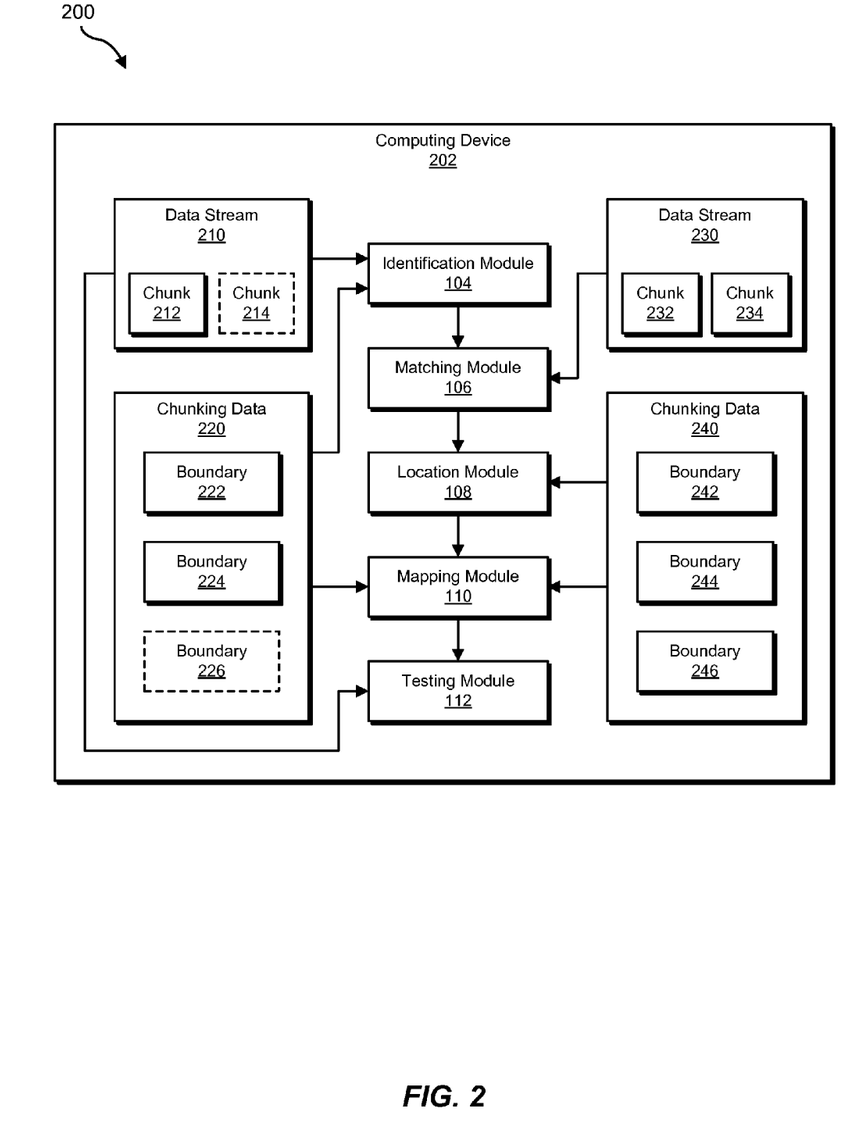
FIG. 2 is a block diagram of an exemplary system for variable-length chunking for deduplication.
Figure 4:
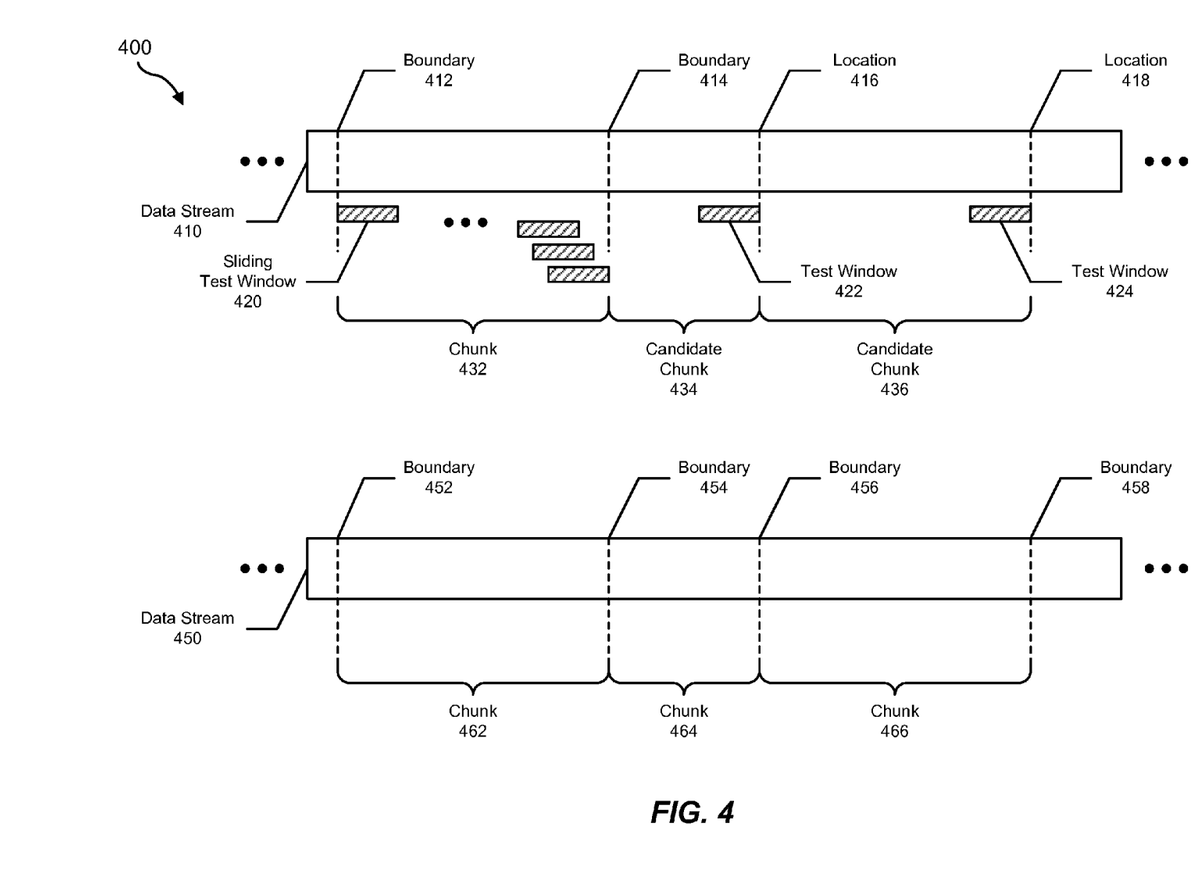
FIG. 4 is an illustration of exemplary data streams.
Figure 5:
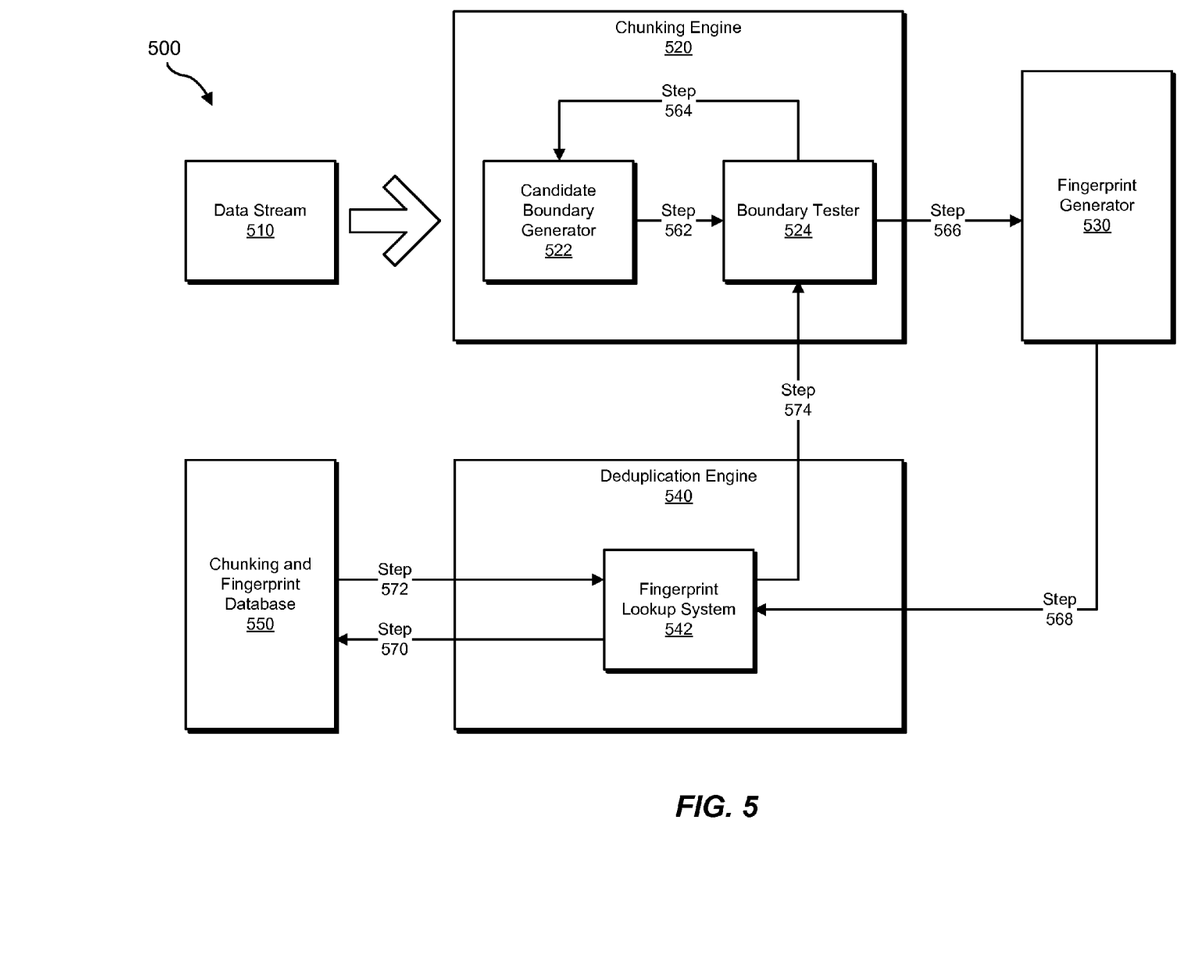
FIG. 5 is a block diagram of an exemplary system for variable-length chunking for deduplication.

The following will provide, with reference to FIGS. 1, 2, and 5, detailed descriptions of exemplary systems for variable-length chunking for deduplication. Detailed descriptions of corresponding computer-implemented methods will also be provided in connection with FIG. 3. Detailed descriptions of exemplary data streams will be provided in connection with FIG. 4. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for variable-length chunking for deduplication. As illustrated in this figure, exemplary system 100 may include one or more modules 102 for performing one or more tasks. For example, and as will be explained in greater detail below, exemplary system 100 may include a an identification module 104 programmed to 1) identify a first data stream subject to deduplication using variable-length chunking and 2) identify a predetermined chunk of the first data stream that starts at a first location within the first data stream and ends at a second location within the first data stream. Exemplary system 100 may also include a matching module 106 programmed to identify, based on the predetermined chunk, a second data stream that includes a matching chunk that matches the predetermined chunk, starts at a third location within the second data stream, and ends at a fourth location within the second data stream.

In addition, and as will be described in greater detail below, exemplary system 100 may include a location module 108 programmed to identify a subsequent chunk within the second data stream that starts at the fourth location within the second data stream and ends at a fifth location within the second data stream. Exemplary system 100 may also include a mapping module 110 programmed to calculate a candidate boundary offset within the first data stream based on exceeding the second location within the first data stream by a difference between the fifth location within the second data stream and the fourth location within the second data stream. Exemplary system 100 may additionally include a testing module 112 programmed to perform a boundary test at the candidate boundary offset to determine whether the candidate boundary offset is a location of a chunk boundary within the first data stream. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 illustrated in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 (e.g., for deduplicating data, including, e.g., a data stream 210 and a data stream 230).

In one embodiment, one or more of modules 102 from FIG. 1 may, when executed by at least one processor of computing device 202, facilitate computing device 202 in variable-length chunking for deduplication. For example, and as will be described in greater detail below, one or more of modules 102 may cause computing device 202 to 1) identify a data stream 210 subject to deduplication using variable-length chunking, 2) identify a predetermined chunk 212 of data stream 210 that starts at a boundary 222 within data stream 210 and ends at a boundary 224 within data stream 210, 3) identify, based on chunk 212, a data stream 230 with a chunk 232 that matches chunk 212 and that starts at a boundary 242 within data stream 230 and ends at a boundary 244 within data stream 230, 4) identify a subsequent chunk 234 within data stream 230 that starts at boundary 244 within data stream 230 and ends at a boundary 246 within data stream 230, 5) calculate a candidate boundary 226 within data stream 210 based on exceeding boundary 224 within data stream 210 by the difference between boundary 246 within data stream 230 and boundary 244 within data stream 230, and 6) perform a boundary test at boundary 226 to determine whether boundary 226 is a location of a chunk boundary within data stream 210.

Computing device 202 generally represents any type or form of computing device capable of reading computer-executable instructions. Examples of computing device 202 include, without limitation, laptops, tablets, desktops, servers, cellular phones, personal digital assistants (PDAs), multimedia players, embedded systems, combinations of one or more of the same, exemplary computing system 610 in FIG. 6, or any other suitable computing device.

Figure 3:
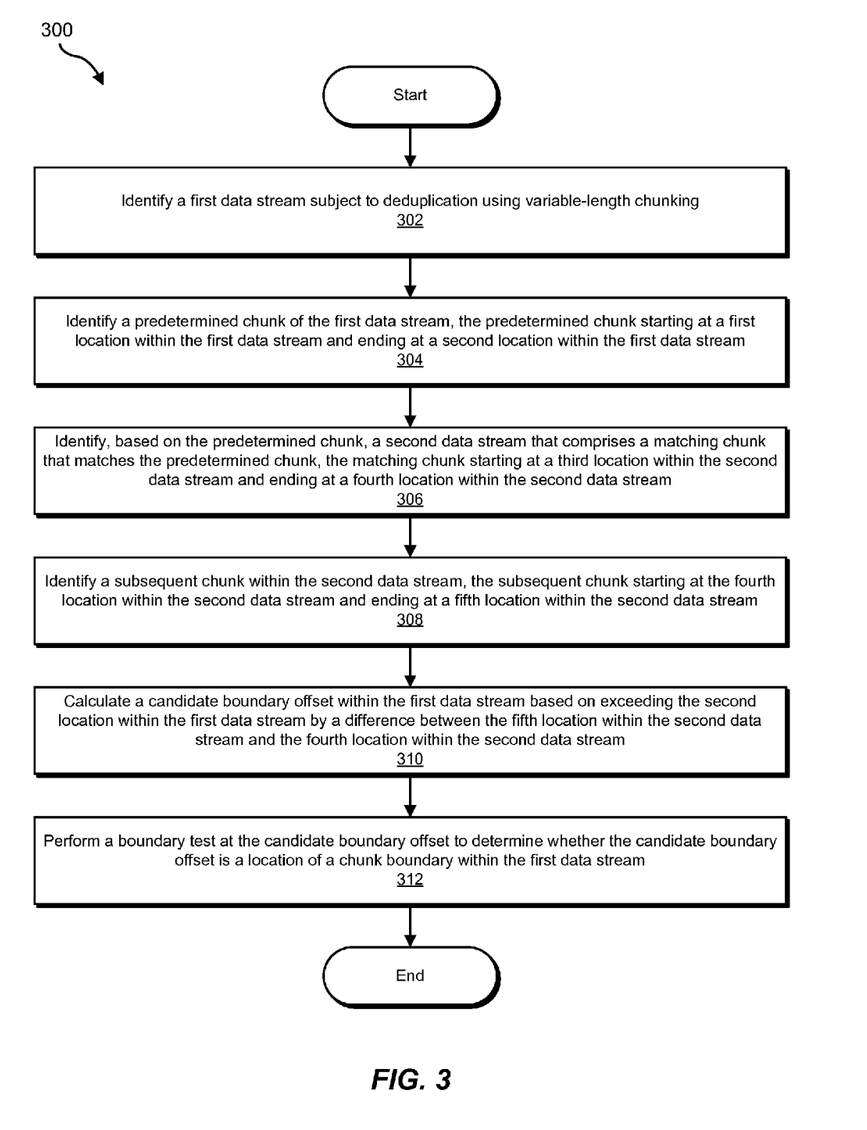
FIG. 3 is a flow diagram of an exemplary method for variable-length chunking for deduplication.

FIG. 3 is a flow diagram of an exemplary computer-implemented method 300 for variable-length chunking for deduplication. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a first data stream subject to deduplication using variable-length chunking. For example, at step 302 identification module 104 may, as part of computing device 202 in FIG. 2, identify a data stream 210 subject to deduplication using variable-length chunking.

As used herein, the phrase "data stream" may refer to any file, image, data object, stream, database, record, and/or document which may include data to be deduplicated. As used herein, the term "deduplication" may refer to one or more operations related to reducing the amount of storage space used in a data storage system, including operations for detecting and preventing data from being redundantly stored within a storage system. For example, data deduplication may reduce the amount of storage space used in a data storage system by detecting and removing redundant copies of data in the data storage system (and, e.g., replacing the redundant copies with references to a single copy). In some examples, a deduplicated data system may reduce the amount of space required to store similar files by dividing the files into chunks and storing only unique chunks. In this example, each deduplicated file may simply consist of a list of chunks that make up the file. In some examples, the deduplicated data system may divide the files into variable-length chunks. As will be explained in greater detail below, the boundaries of each variable-length chunk may be determined by any of a variety of factors, including a boundary test function for identifying locations within a data stream that satisfy a certain property, a predetermined target average chunk size, a minimum chunk size, and/or a maximum chunk size.

Identification module 104 may identify the first data stream in any suitable context. For example, identification module 104 may identify the first data stream by identifying a file within a volume of data configured for deduplication. Additionally or alternatively, identification module 104 may identify the first data stream by identifying a file to be added to the volume of data configured for deduplication.

FIG. 4 illustrates exemplary data streams 400. As shown in FIG. 4, exemplary data streams 400 may include a data stream 410 and a data stream 450. In some examples, one or more of the systems described herein may be configured to divide data stream 410 into chunks for deduplication. Using FIG. 4 as an example, at step 302 identification module 104 may identify data stream 410.

FIG. 5 illustrates an exemplary system 500 for variable-length chunking for deduplication. As shown in FIG. 5, exemplary system 500 may include a data stream 510 used as input for a chunking engine 520. Using FIG. 5 as an example, at step 302 identification module 104 may identify data stream 510.

Returning to FIG. 3, at step 304 one or more of the systems described herein may identify a predetermined chunk of the first data stream that starts at a first location within the first data stream and ends at a second location within the first data stream. For example, at step 304 identification module 104 may, as part of computing device 202 in FIG. 2, identify predetermined chunk 212 of data stream 210 that starts at boundary 222 within data stream 210 and ends at boundary 224 within data stream 210.

Identification module 104 may identify the predetermined chunk in any suitable manner. For example, identification module 104 may identify chunk boundary metadata that defines the boundaries of one or more chunks within the first data stream (e.g., the first location and the second location as boundaries of the predetermined chunk). As used herein, the term "location" as used here with respect to data streams may refer to any defined offset, position, and/or boundary within a data stream.

In some examples, identification module 104 may identify the predetermined chunk based on chunk boundary metadata of another data stream. For example, identification module 104 may identify a candidate data stream with metadata that matches the first data stream (and which, e.g., has been chunked for deduplication). The metadata may include any of a variety of information that may indicate a similarity between the data stream and the candidate data stream. For example, the metadata may include the name of the data stream (which, e.g., may be the same as and/or similar to the name of the candidate data stream), the size of the data stream (which may be the same as and/or similar to the size of the candidate data stream), a type of the data stream (e.g., indicating a file format and/or document type of the data stream matching the candidate data stream), a timestamp of the data stream (e.g., indicating that the data stream was created and/or last modified near a time of creation and/or modification of the candidate data stream), versioning data (e.g., indicating that the candidate data stream is a modified version of the data stream, or vice versa), and/or a location of the data stream (e.g., the data stream being found in the same directory and/or a similar path as the candidate data stream).

After identifying the candidate data stream, identification module 104 may identify a first chunk end boundary within the candidate data stream. For example, identification module 104 may identify a length of the first chunk within the candidate data stream and/or an offset within the candidate data stream at which the first chunk of the candidate data stream ends. Identification module 104 may then perform a boundary test at an offset within the first data stream equal to an offset of the first chunk end boundary within the candidate data stream to determine whether the offset within the first data stream is a location of a boundary of the predetermined chunk. As used herein, the phrase "boundary test" may refer to any suitable function and/or algorithm for determining whether a location within a data stream meets one or more conditions and/or has one or more properties of a chunk boundary in a variable-length chunking scheme (e.g., applied consistently across data streams in a deduplication system). For example, the boundary test may include sampling data at a candidate boundary location within a data stream and mapping the data (e.g., with a surjective function) to a determination of whether the candidate boundary location is and/or may be a chunk boundary. As an example, the boundary test may include performing a checksum of a fixed number of bytes before the boundary. In some examples, the checksum function may be chosen to result in a predetermined target average chunk size.

In some examples, identification module 104 may identify the predetermined chunk by performing a sliding test (e.g., performing the boundary test starting from the beginning of the data stream and continuing to each subsequent location within the data stream) until identifying a boundary at which to end the predetermined chunk.

Using FIG. 4 as an example, at step 304 identification module 104 may identify a chunk 432 within data stream 410. For example, identification module 104 may identify a boundary 412 and a boundary 414 of chunk 432 based on preexisting chunk boundary metadata for data stream 410. Additionally or alternatively, identification module 104 may identify boundary 414 by repeatedly performing the boundary test based on a sliding test window 420 of data stream 410 until sliding test window 420 reaches boundary 414 and the boundary test indicates that boundary 414 meets a predefined property for a chunk boundary. As another example, identification module 104 may identify chunk 432 by determining that data stream 410 has similar metadata to another data stream (e.g., data stream 450), identifying a chunk boundary in the other data stream (e.g., a boundary 454), and performing the boundary test at a corresponding offset in data stream 410.

Using FIG. 5 as an example, identification module 104 may identify the predetermined chunk as a part of chunking engine 520. For example, a candidate boundary generator 522 may, at step 562, submit a candidate boundary to a boundary tester 524. If the candidate boundary does not pass the boundary test, at step 564 boundary tester 524 may request another candidate boundary from candidate boundary generator 522. Identification module 104 may repeat steps 562 and 564 until a candidate boundary passes the boundary test and the predetermined chunk is identified.

Returning to FIG. 3, at step 306 one or more of the systems described herein may identify, based on the predetermined chunk, a second data stream with a matching chunk that matches the predetermined chunk and that starts at a third location within the second data stream and ends at a fourth location within the second data stream. For example, at step 306 matching module 106 may, as part of computing device 202 in FIG. 2, identify, based on chunk 212, data stream 230 with a chunk 232 that matches chunk 212 and that starts at boundary 242 within data stream 230 and ends at boundary 244 within data stream 230.

Matching module 106 may identify the second data stream with the matching chunk in any suitable manner. For example, one or more of the systems described herein may have previously chunked (and, e.g., deduplicated) the second data stream (e.g., using the boundary test to determine chunk boundaries). Accordingly, matching module 106 may submit a fingerprint of the predetermined chunk to a deduplication fingerprint database to identify the second data stream with the matching chunk.

In some examples, matching module 106 may identify multiple data streams with chunks matching the predetermined chunk. In these examples, matching module 106 may select the second data stream from the matching data streams. For example, matching module 106 may identify a plurality of candidate data streams that include a plurality of matching chunks that match the predetermined chunk. Matching module 106 may then select the second data stream from the plurality of candidate data streams based on an additional similarity between the first data stream and the second data stream. The additional similarity may include any of a variety of factors. For example, matching module 106 may select the second data stream based on a similarity between the name of the first data stream and the name of the second data stream. Additionally or alternatively, matching module 106 may select the second data stream based on a similarity between the size of the first data stream and the size of the second data stream. In another example, matching module 106 may select the second data stream based on a similarity between the types of the first and second data streams (e.g., the file formats and/or document types of the first and second data streams). Additionally or alternatively, matching module 106 may select the second data stream based on versioning data of the first and second data streams indicating that the first and second data streams are two versions of a single data object. Variously, matching module 106 may select the data stream based on a timestamp of the second data stream being similar to a timestamp of the first data stream, a location of the second data stream being similar to a location of the first data stream, and/or any other suitable criteria (e.g., which may imply similarities in the content of the first and second data streams).

Using FIG. 4 as an example, at step 306 matching module 106 may identify data stream 450 based on chunk 432 of data stream 410 matching chunk 462 of data stream 450. For example, matching module 106 may query a fingerprint database with a fingerprint of chunk 432 and receive an identifier of chunk 462 in data stream 450 as a response.

Using FIG. 5 as an example, matching module 106 may, at step 566, as a part of chunking engine 520, submit the predetermined chunk to a fingerprint generator 530. At step 568, matching module 106 may, as a part of fingerprint generator 530, submit the resulting fingerprint to a fingerprint lookup system 542 of a deduplication engine 540. At step 570, fingerprint lookup system 542 may submit the fingerprint to a chunking and fingerprint database 550. At step 572, fingerprint lookup system 542 may receive an identification of the second data stream from chunking and fingerprint database 550 (along with, e.g., chunking metadata for the second data stream).

Returning to FIG. 3, at step 308 one or more of the systems described herein may identify a subsequent chunk within the second data stream that starts at the fourth location within the second data stream and ends at a fifth location within the second data stream. For example, at step 308 location module 108 may, as part of computing device 202 in FIG. 2, identify subsequent chunk 234 within data stream 230 that starts at boundary 244 within data stream 230 and ends at boundary 246 within data stream 230.

Location module 108 may identify the subsequent chunk within the second data stream in any suitable manner. For example, location module 108 may identify the subsequent chunk based on existing chunk boundary metadata for the second data stream. In some examples, location module 108 may identify the subsequent chunk by identifying the fifth location within the second data stream. In some examples, one or more of the systems described herein may have previously identified the chunk boundaries within the second data stream based on the boundary test. For example, one or more of the systems described herein may have identified the fifth location as a boundary of the subsequent chunk by performing the boundary test at the fifth location within the second data stream.

Using FIG. 4 as an example, at step 308 location module 108 may identify a chunk 464 of data stream 450. For example, location module 108 may identify boundary 454 and/or a boundary 456 within data stream 450.

Using FIG. 5 as an example, location module 108 may identify the subsequent chunk by, e.g., receiving chunking metadata for the second data stream from chunking and fingerprint database 550 (e.g., at step 572 as a part of fingerprint lookup system 542 and/or at step 574 as a part of boundary tester 524).

Returning to FIG. 3, at step 310 one or more of the systems described herein may calculate a candidate boundary offset within the first data stream based on exceeding the second location within the first data stream by a difference between the fifth location within the second data stream and the fourth location within the second data stream. For example, at step 310 mapping module 110 may, as part of computing device 202 in FIG. 2, calculate a candidate boundary 226 within data stream 210 based on exceeding boundary 224 within data stream 210 by the difference between boundary 246 within data stream 230 and boundary 244 within data stream 230.

Mapping module 110 may calculate the candidate boundary offset in any suitable manner. For example, mapping module 110 may identify the offset of the fifth location within the second data stream and subtract from it the offset of the fourth location within the second data stream. Mapping module 110 may then add the difference to an offset of the second location within the first data stream.

Using FIG. 4 as an example, at step 310 mapping module 110 may subtract an offset of boundary 454 from an offset of boundary 456, and add the result to an offset of boundary 414 within data stream 410, resulting in an offset of a location 416 within data stream 410.

Returning to FIG. 3, at step 312 one or more of the systems described herein may perform a boundary test at the candidate boundary offset to determine whether the candidate boundary offset is a location of a chunk boundary within the first data stream. For example, at step 312 testing module 112 may, as part of computing device 202 in FIG. 2, perform a boundary test at boundary 226 to determine whether boundary 226 is a location of a chunk boundary within data stream 210.

Testing module 112 may perform the boundary test in any suitable manner. For example, testing module 112 may identify data at the candidate boundary offset (e.g., a fixed-width segment of data directly before the offset) within the first data stream. Testing module 112 may then apply a function to the data to determine whether the data at the candidate boundary offset possesses a property predetermined to signify a chunk boundary. For example, testing module 112 may calculate a checksum at the candidate boundary offset (e.g., a checksum of a window of data at the candidate boundary offset). As used herein, the term "checksum" may refer to any checksum, fingerprint and/or hash. In some examples, testing module 112 may be configured with a checksum function that results in a predetermined target average chunk size (e.g., by mapping data windows to positive boundary determinations at such a rate as to result in a proportion of chunk boundaries equal to the inverse of the target averaged chunk size). In some examples, testing module 112 may also determine that the candidate boundary offset is above a minimum distance from a previous boundary and/or below a maximum distance from the previous boundary.

In some examples, testing module 112 may determine that the candidate boundary offset represents a chunk boundary. For example, testing module 112 may perform the boundary test and determine that the candidate boundary offset includes the chunk boundary within the first data stream. In these examples, testing module 112 may also identify a new chunk beginning at the second location within the first data stream and ending at the candidate boundary offset within the first data stream. In these examples, testing module 112 may also deduplicate the first data stream by deduplicating the new chunk with at least one identical chunk. After testing module 112 identifies the new chunk, in some examples one or more of the systems described herein may repeat one or more of the methods described herein to find the next chunk boundary in the first data stream. These systems may continue these methods until the entire first data stream is chunked for deduplication.

In some examples, testing module 112 may determine that the candidate boundary offset does not represent a chunk boundary. For example, testing module 112 may perform the boundary test and determine that the candidate boundary offset does not include the chunk boundary within the first data stream. In these examples, the testing module 112 may perform the boundary test at sequential offsets within the first data stream until the boundary test identifies the chunk boundary within the first data stream. For example, testing module 112 may perform the boundary test on a sliding window of data beginning with the second location in the first data stream until the boundary test identifies a property indicating a suitable boundary location. In some examples, once testing module 112 identifies a suitable boundary location by performing the boundary test on the sliding window of data, one or more of the systems described herein may repeat one or more of the methods described herein to find the next chunk boundary in the first data stream. Additionally or alternatively, in some examples, testing module 112 may fail to find chunk boundaries using chunking metadata from other data streams after multiple attempts. In these examples, testing module 112 may revert to alternative methods for finding chunk boundaries (e.g., performing iterations the boundary test on a sliding window of data until the boundary test identifies a chunk boundary location). In these examples, testing module 112 may use the alternative methods to identify one or more boundaries before reverting back to attempting the use of chunking metadata to identify chunk boundaries.

Using FIG. 4 as an example, at step 312 testing module 112 may perform the boundary test at location 416 (e.g., by applying a boundary test function to a test window 422 ending at location 416 within data stream 410) and determine, based on the boundary test, that location 416 represents a chunk boundary within data stream 410. Accordingly, testing module 112 may determine that a candidate chunk 434 is a chunk within data stream 410 for deduplication (e.g., deduplication with a chunk 464 of data stream 450 and any other identical chunks within a deduplicated data system). Afterwards, in some examples, one or more of the systems described herein may identify a boundary 458 within data stream 450 and calculate a corresponding location 418 within data stream 410 (e.g., by adding the distance between boundary 458 and boundary 456 to location 416). In these examples, testing module 112 may perform the boundary test at location 418 (e.g., by applying the boundary test function to a test window 424 ending at location 418 within data stream 410) and determine, based on the boundary test, that location 418 represents a chunk boundary within data stream 410. Accordingly, testing module 112 may determine that a candidate chunk 436 is a chunk within data stream 410 for deduplication (e.g., deduplication with a chunk 466 of data stream 450 and any other identical chunks within the deduplicated data system).

As explained above, by using chunk-boundary data for files that have already been chunked as indications of likely chunk boundaries for files that are being chunked, the systems and methods described herein may use similarities between files to quickly locate candidate boundaries (instead of, e.g., performing rolling checksums across entire files to find each chunk boundary). By using existing chunking data to target locations within files for chunk boundary tests, these systems and methods may avoid millions of I/O and checksum operations for each file requiring chunking.

Figure 6:
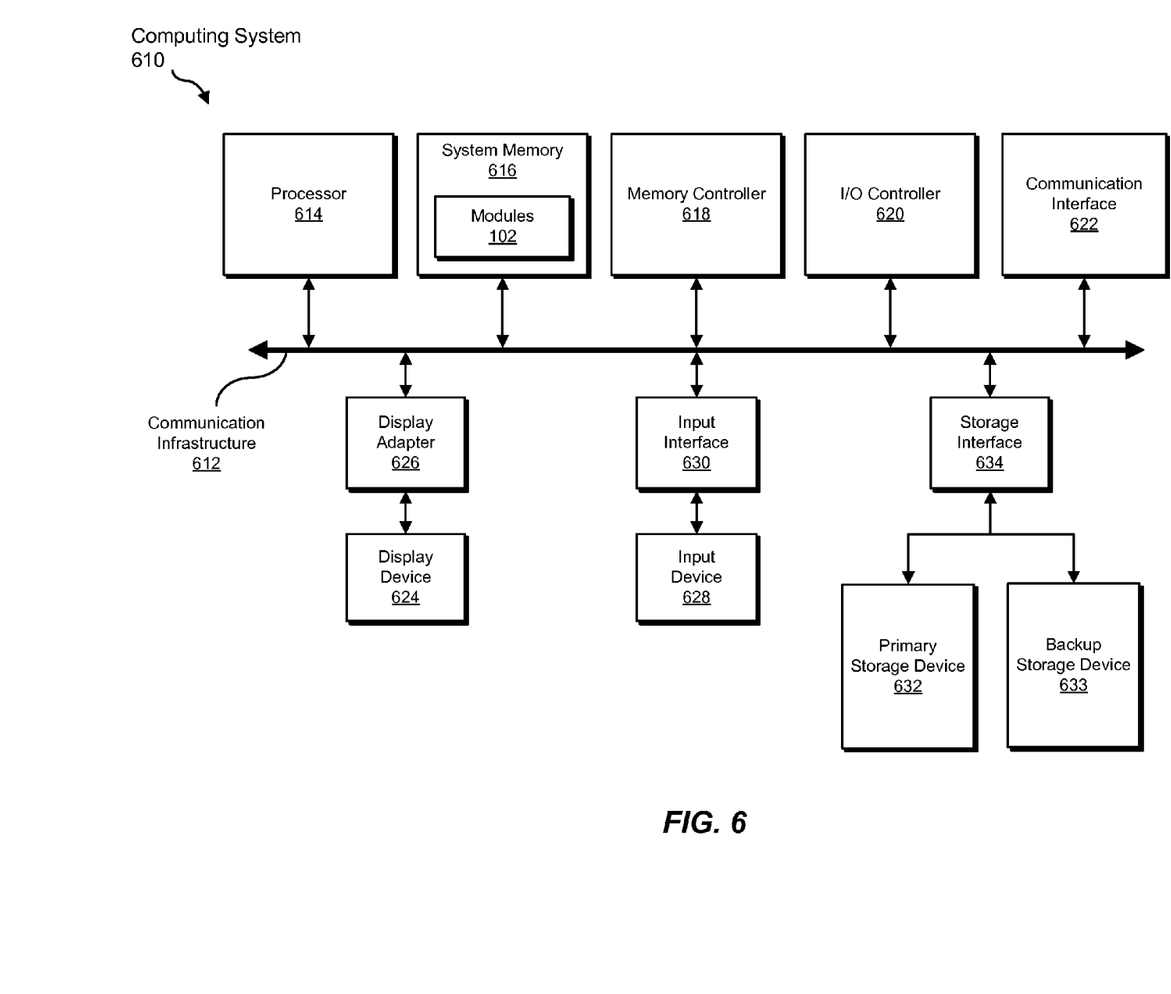
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the identifying, performing, selecting, calculating, and deduplicating steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
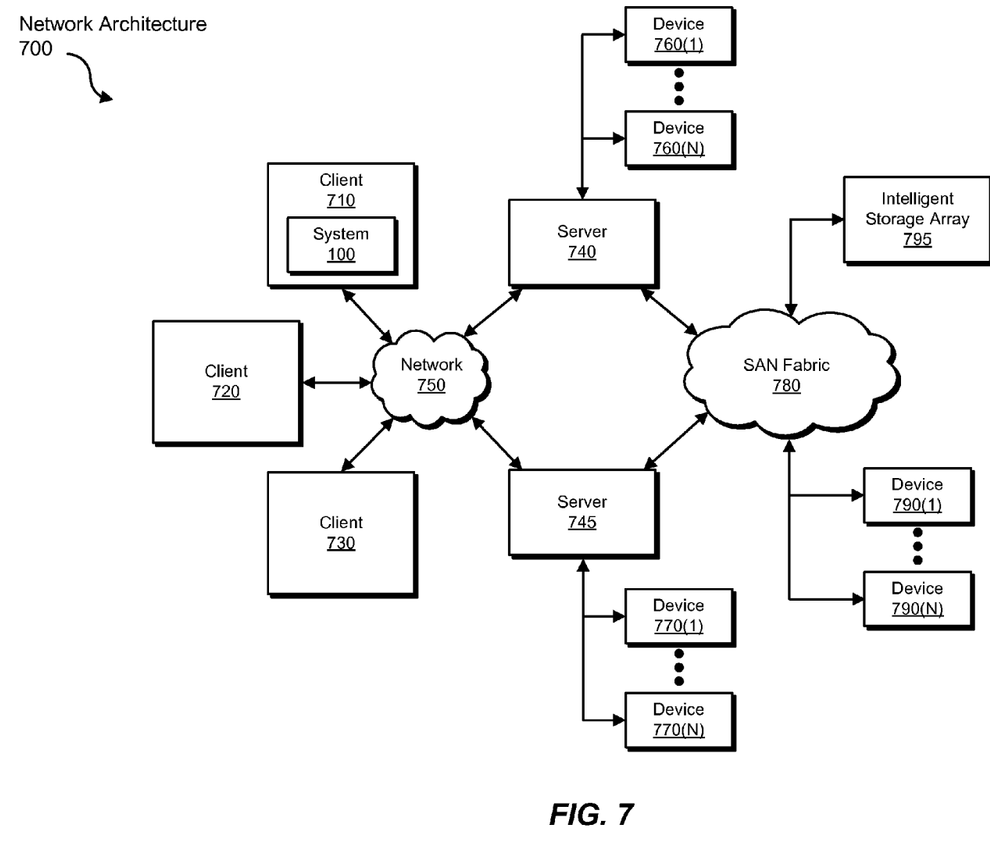
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, performing, selecting, calculating, and deduplicating steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for variable-length chunking for deduplication.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into a device for variable-length chunking for deduplication. As another example, one or more of the modules described herein may transform a volume of data into a volume of deduplicated variable-length data chunks.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for variable-length chunking for deduplication, at least a portion of the computer-implemented method being performed by a computing device comprising at least one processor, the computer-implemented method comprising:

identifying a first data stream subject to deduplication using variable-length chunking;

identifying a predetermined chunk of the first data stream, the predetermined chunk starting at a first location within the first data stream and ending at a second location within the first data stream;

identifying, based on the predetermined chunk, a second data stream that comprises a matching chunk that matches the predetermined chunk, the matching chunk starting at a third location within the second data stream and ending at a fourth location within the second data stream;

identifying a subsequent chunk within the second data stream, the subsequent chunk starting at the fourth location within the second data stream and ending at a fifth location within the second data stream;

calculating a candidate boundary offset within the first data stream based on exceeding the second location within the first data stream by a difference between the fifth location within the second data stream and the fourth location within the second data stream;

performing a boundary test at the candidate boundary offset to determine whether the candidate boundary offset is a location of a chunk boundary within the first data stream, wherein the boundary test indicates a likelihood that a candidate chunk beginning at the second location within the first data stream and ending at the candidate boundary offset matches the subsequent chunk; and chunking the first data stream based on the boundary test by beginning a chunk at the second location and ending the chunk at the candidate boundary offset.

2. The computer-implemented method of claim 1, wherein the fifth location was identified as a boundary of the subsequent chunk by performing the boundary test at the fifth location within the second data stream.

3. The computer-implemented method of claim 1, wherein the identifying the second data stream comprises:

identifying a plurality of candidate data streams that comprise a plurality of matching chunks that match the predetermined chunk; and selecting the second data stream from the plurality of candidate data streams based on an additional similarity between the first data stream and the second data stream.

4. The computer-implemented method of claim 3, wherein selecting the second data stream based on the additional similarity comprises at least one of:

selecting the second data stream based on a similarity between a name of the first data stream and a name of the second data stream;

selecting the second data stream based on a similarity between a size of the first data stream and a size of the second data stream; and selecting the second data stream based on a similarity between a relative location of the first location within the first data stream and a relative location of the third location within the second data stream.

5. The computer-implemented method of claim 1, wherein performing the boundary test at the candidate boundary offset comprises determining that the candidate boundary offset does not comprise the chunk boundary within the first data stream; and further comprising performing the boundary test at sequential offsets within the first data stream until the boundary test identifies the chunk boundary within the first data stream.

6. The computer-implemented method of claim 1, wherein the identifying the predetermined chunk comprises the performing the boundary test at sequential offsets within the first data stream until the boundary test identifies the second location within the first data stream as a boundary of the predetermined chunk.

7. The computer-implemented method of claim 1, wherein the identifying the predetermined chunk comprises:

identifying a candidate data stream with metadata that matches the first data stream;

identifying a first chunk end boundary within the candidate data stream; and performing the boundary test at an offset within the first data stream equal to an offset of the first chunk end boundary within the candidate data stream to determine whether the offset within the first data stream is a location of a boundary of the predetermined chunk.

8. The computer-implemented method of claim 1, wherein the performing the boundary test comprises calculating a checksum at the candidate boundary offset.

9. The computer-implemented method of claim 1, wherein the performing the boundary test at the candidate boundary offset comprises determining that the candidate boundary offset comprises the chunk boundary within the first data stream; and further comprising identifying a new chunk beginning at the second location within the first data stream and ending at the candidate boundary offset within the first data stream.

10. The computer-implemented method of claim 9, further comprising deduplicating the first data stream by deduplicating the new chunk with at least one identical chunk.

11. A system for variable-length chunking for deduplication, the system comprising:

an identification module programmed to:

identify a first data stream subject to deduplication using variable-length chunking;

identify a predetermined chunk of the first data stream, the predetermined chunk starting at a first location within the first data stream and ending at a second location within the first data stream;

a matching module programmed to identify, based on the predetermined chunk, a second data stream that comprises a matching chunk that matches the predetermined chunk, the matching chunk starting at a third location within the second data stream and ending at a fourth location within the second data stream;

a location module programmed to identify a subsequent chunk within the second data stream, the subsequent chunk starting at the fourth location within the second data stream and ending at a fifth location within the second data stream;

a mapping module programmed to calculate a candidate boundary offset within the first data stream based on exceeding the second location within the first data stream by a difference between the fifth location within the second data stream and the fourth location within the second data stream;

a testing module programmed to:

perform a boundary test at the candidate boundary offset to determine whether the candidate boundary offset is a location of a chunk boundary within the first data stream, wherein the boundary test indicates a likelihood that a candidate chunk beginning at the second location within the first data stream and ending at the candidate boundary offset matches the subsequent chunk;

chunk the first data stream based on the boundary test by beginning a chunk at the second location and ending the chunk at the candidate boundary offset; and at least one processor configured to execute the identification module, the matching module, the location module, the mapping module, and the testing module.

12. The system of claim 11, wherein the fifth location was identified as a boundary of the subsequent chunk by performing the boundary test at the fifth location within the second data stream.

13. The system of claim 11, wherein the matching module is programmed to identify the second data stream by:

identifying a plurality of candidate data streams that comprise a plurality of matching chunks that match the predetermined chunk; and selecting the second data stream from the plurality of candidate data streams based on an additional similarity between the first data stream and the second data stream.

14. The system of claim 13, wherein the matching module is programmed to select the second data stream based on the additional similarity by at least one of:
   selecting the second data stream based on a similarity between a name of the first data stream and a name of the second data stream;
   selecting the second data stream based on a similarity between a size of the first data stream and a size of the second data stream; and
   selecting the second data stream based on a similarity between a relative location of the first location within the first data stream and a relative location of the third location within the second data stream.

15. The system of claim 11,
   wherein the testing module is programmed to perform the boundary test at the candidate boundary offset by determining that the candidate boundary offset does not comprise the chunk boundary within the first data stream; and
   wherein the testing module is further programmed to perform the boundary test at sequential offsets within the first data stream until the boundary test identifies the chunk boundary within the first data stream.

16. The system of claim 11, wherein the identification module is programmed to identify the predetermined chunk by performing the boundary test at sequential offsets within the first data stream until the boundary test identifies the second location within the first data stream as a boundary of the predetermined chunk.

17. The system of claim 11, wherein the identification module is programmed to identify the predetermined chunk by:
   identifying a candidate data stream with metadata that matches the first data stream;
   identifying a first chunk end boundary within the candidate data stream; and
   performing the boundary test at an offset within the first data stream equal to an offset of the first chunk end boundary within the candidate data stream to determine whether the offset within the first data stream is a location of a boundary of the predetermined chunk.

18. The system of claim 11, wherein the testing module is programmed to perform the boundary test by calculating a checksum at the candidate boundary offset.

19. The system of claim 11,
   wherein the testing module is programmed to perform the boundary test at the candidate boundary offset by determining that the candidate boundary offset comprises the chunk boundary within the first data stream;
   further comprising a deduplication module programmed to:
   identify a new chunk beginning at the second location within the first data stream and ending at the candidate boundary offset within the first data stream; and
   deduplicate the first data stream by deduplicating the new chunk with at least one identical chunk.

20. A non-transitory computer-readable-storage medium comprising one or more computer-executable instructions that, when executed by at least one processor of a computing device, cause the computing device to:
   identify a first data stream subject to deduplication using variable-length chunking;
   identify a predetermined chunk of the first data stream, the predetermined chunk starting at a first location within the first data stream and ending at a second location within the first data stream;
   identify, based on the predetermined chunk, a second data stream that comprises a matching chunk that matches the predetermined chunk, the matching chunk starting at a third location within the second data stream and ending at a fourth location within the second data stream;
   identify a subsequent chunk within the second data stream, the subsequent chunk starting at the fourth location within the second data stream and ending at a fifth location within the second data stream;
   calculate a candidate boundary offset within the first data stream based on exceeding the second location within the first data stream by a difference between the fifth location within the second data stream and the fourth location within the second data stream;
   perform a boundary test at the candidate boundary offset to determine whether the candidate boundary offset is a location of a chunk boundary within the first data stream, wherein the boundary test indicates a likelihood that a candidate chunk beginning at the second location within the first data stream and ending at the candidate boundary offset matches the subsequent chunk; and
   chunk the first data stream based on the boundary test by beginning a chunk at the second location and ending the chunk at the candidate boundary offset.

\* \* \* \* \*